United States Patent Office 2,971,287
Patented Feb. 14, 1961

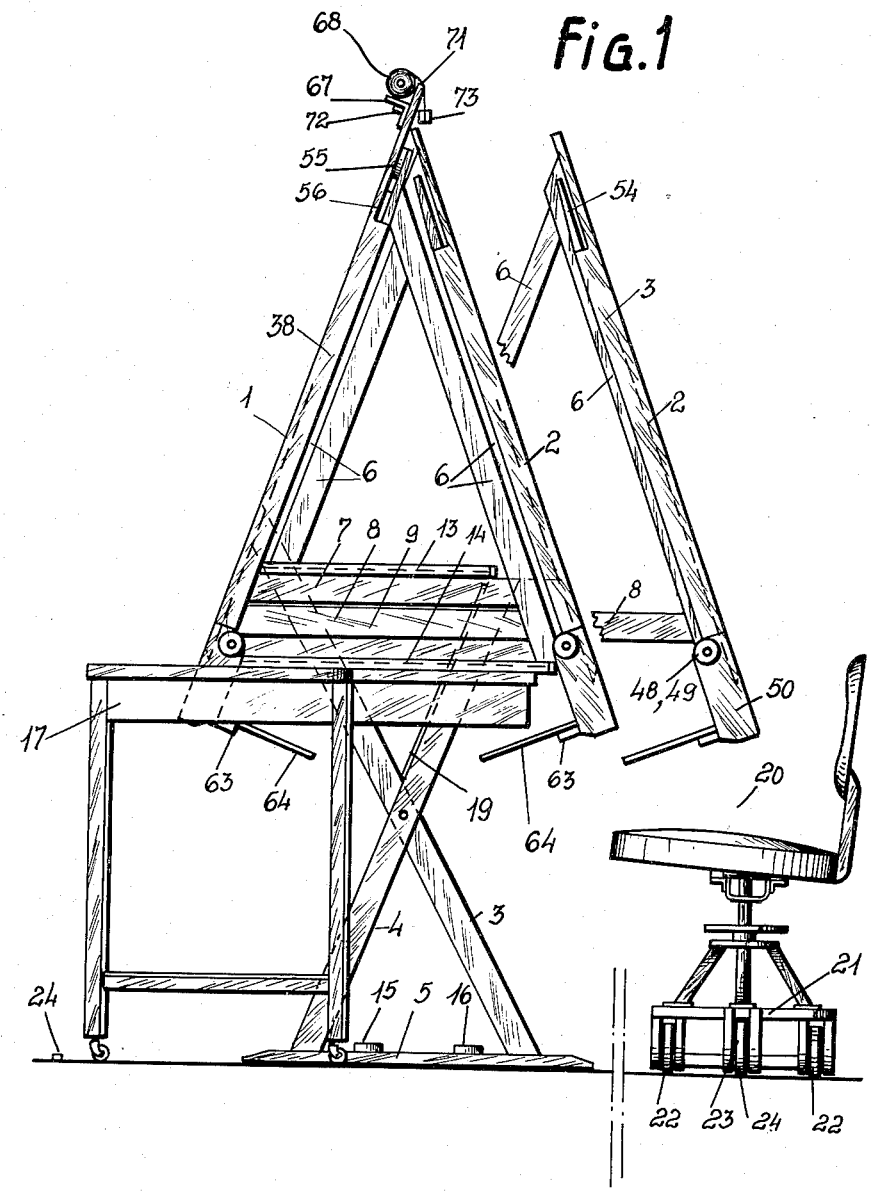

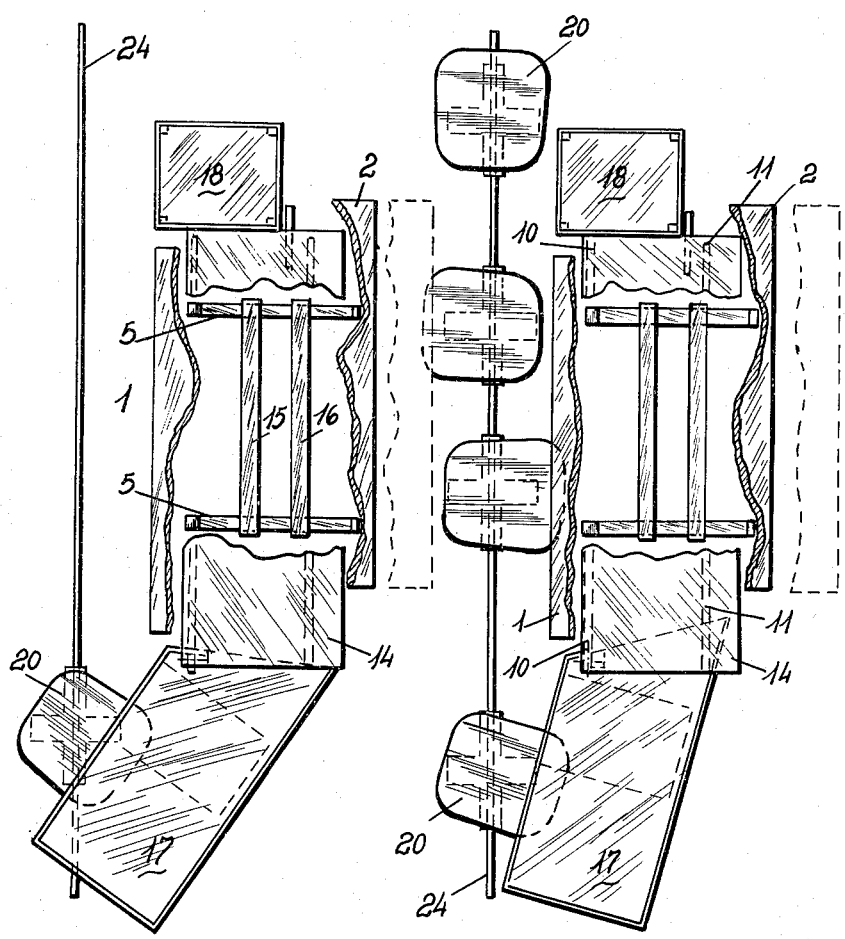

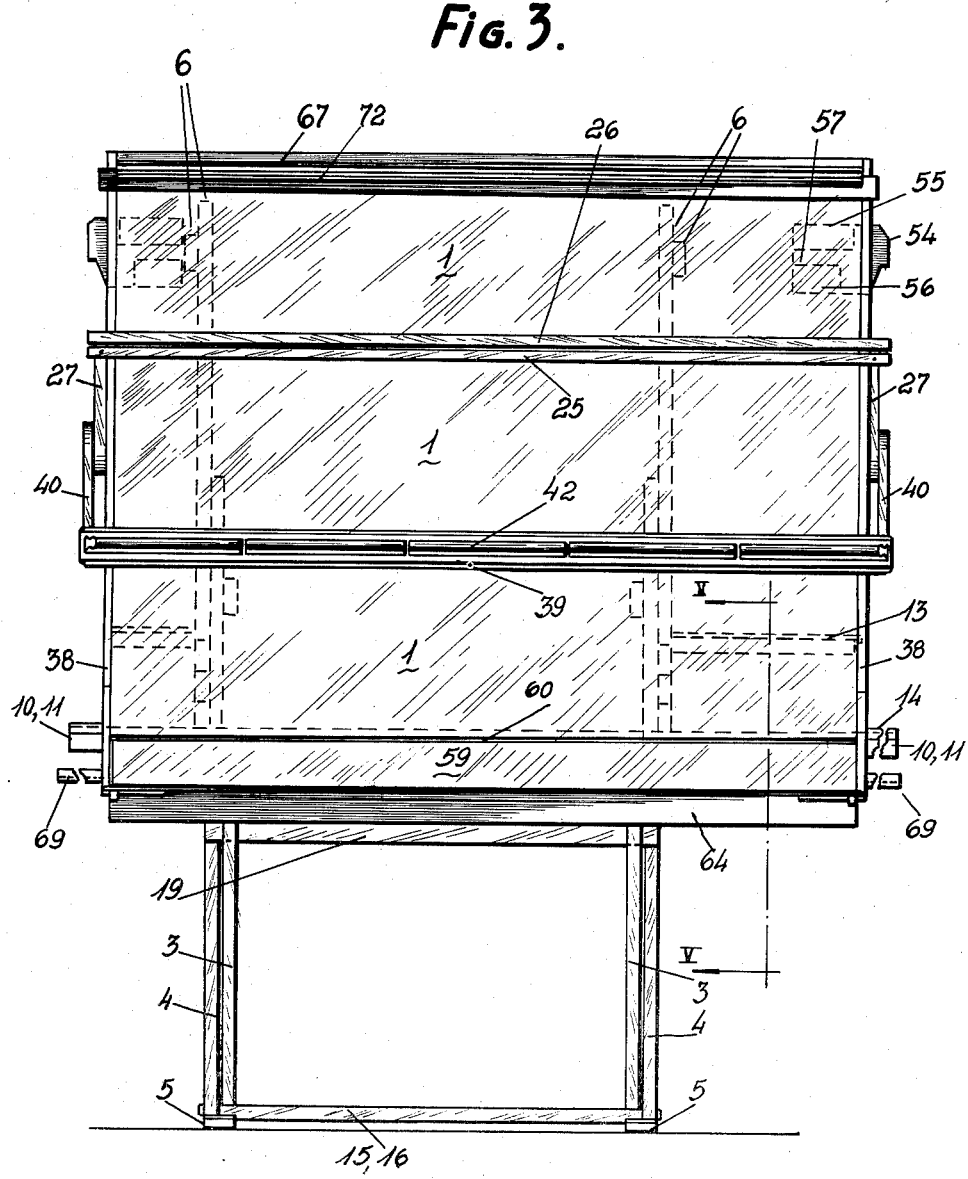

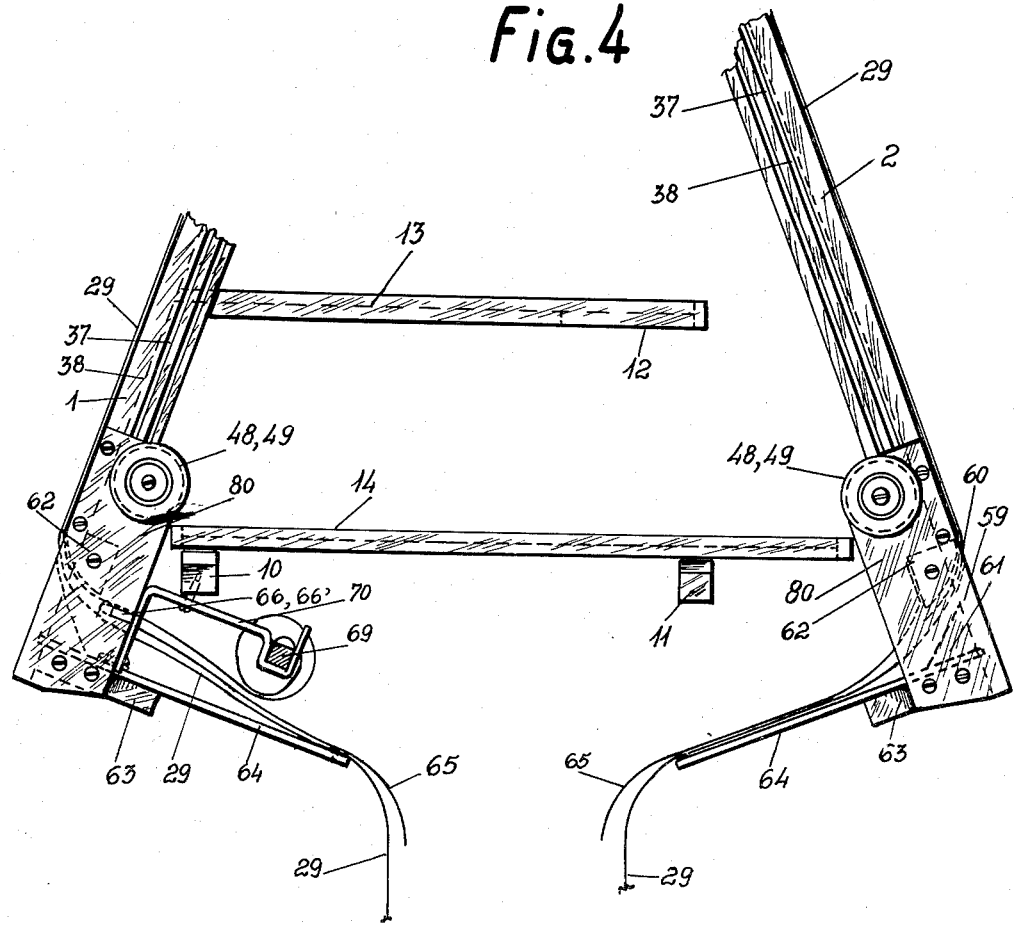

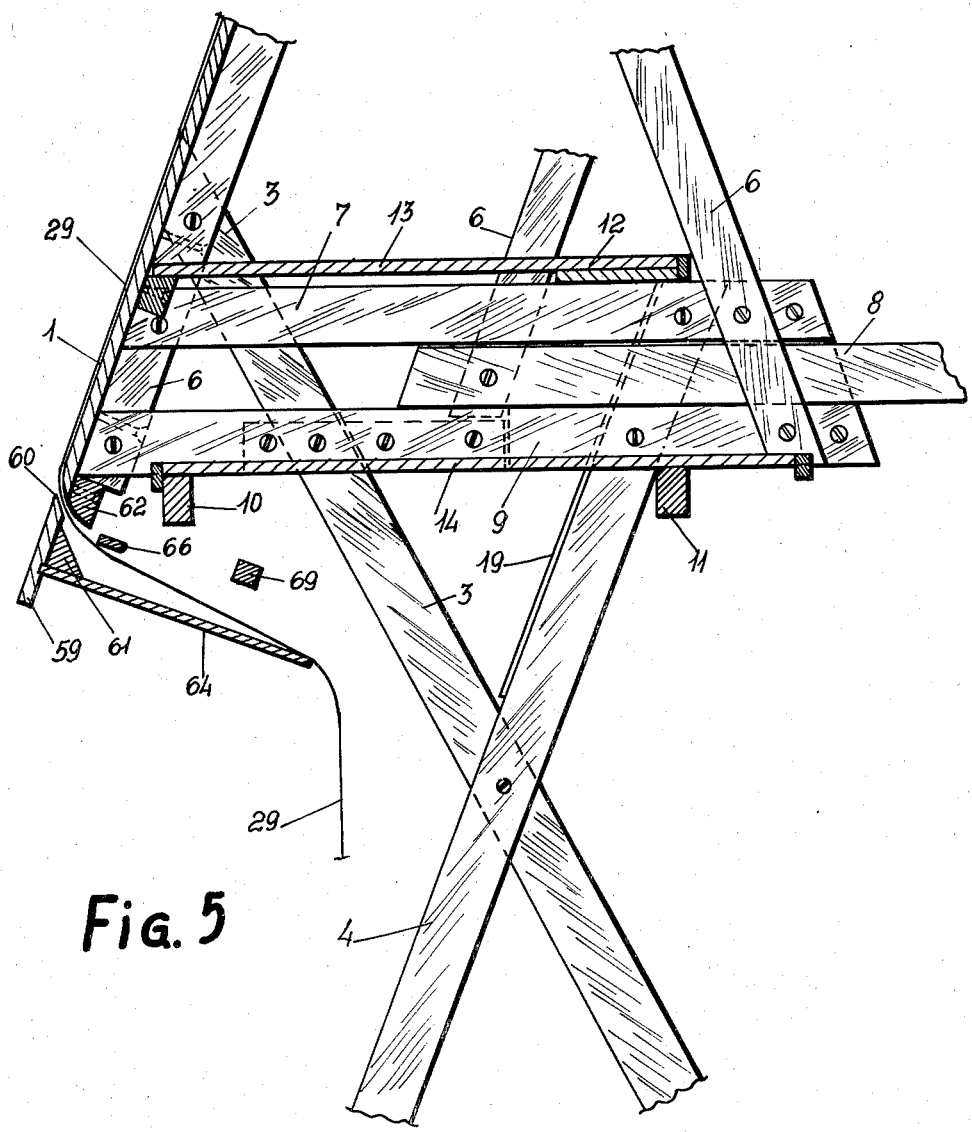

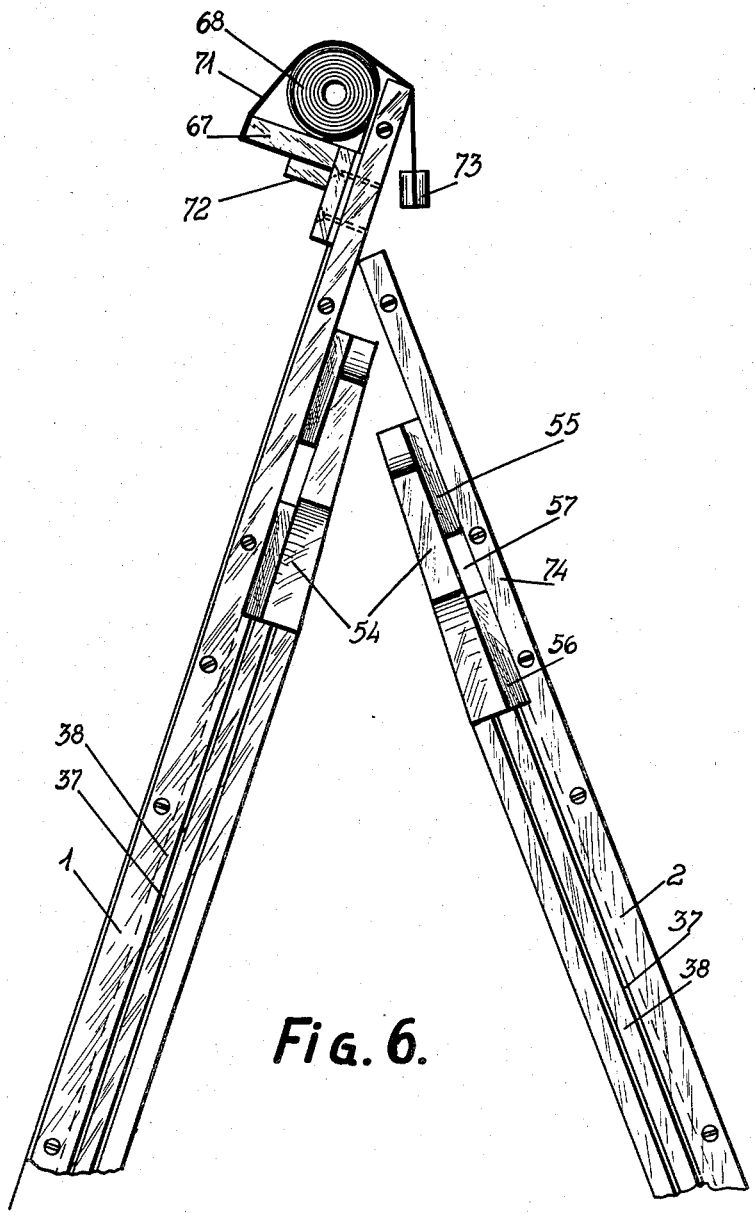

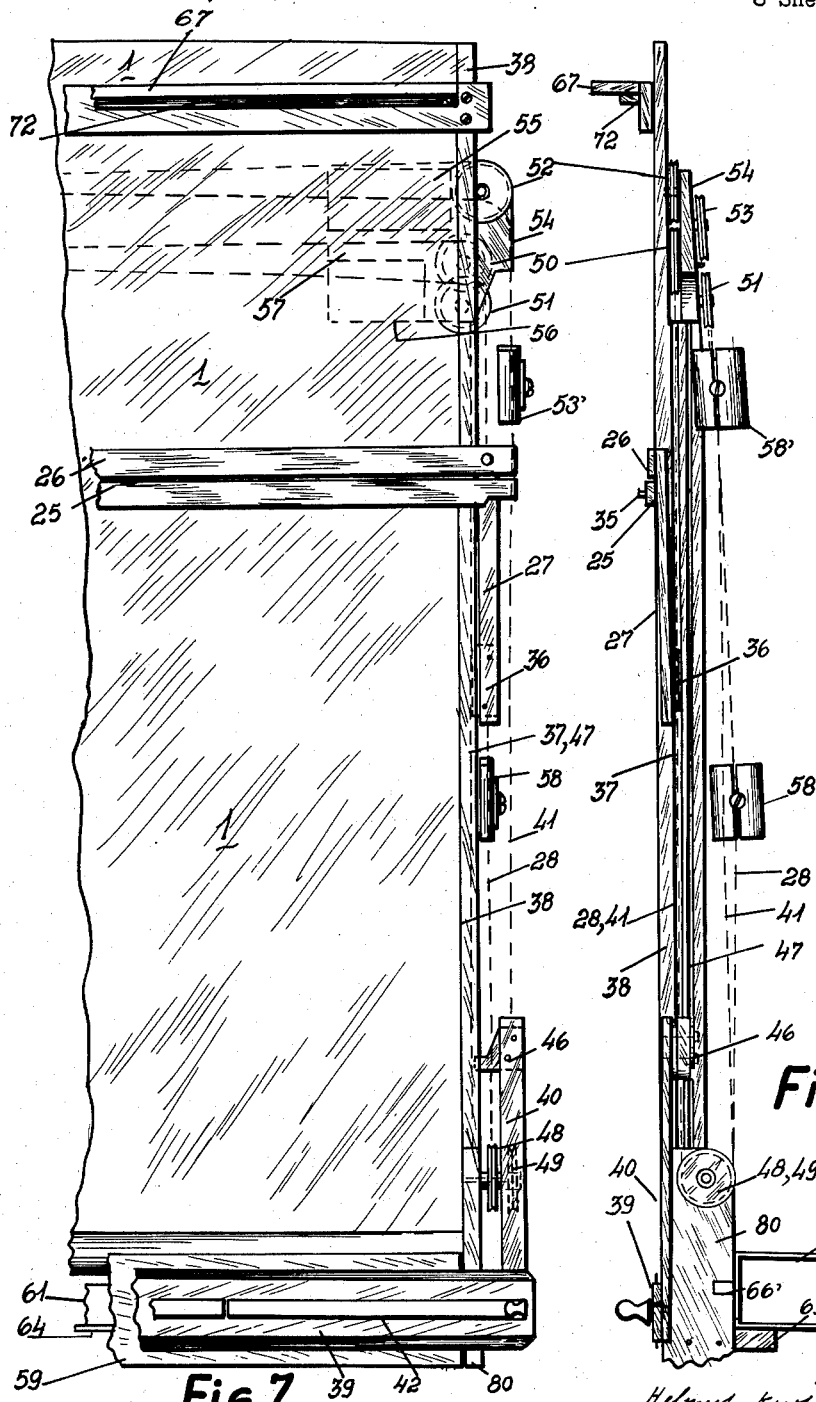

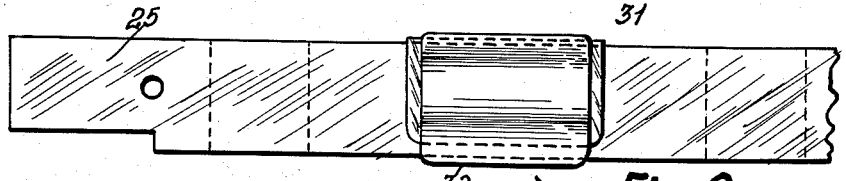
Fig. 9.
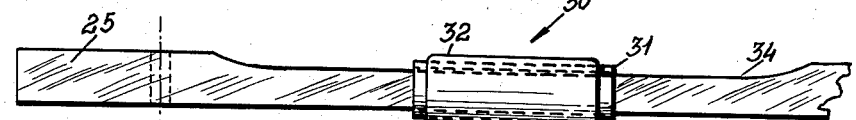
Fig. 10.
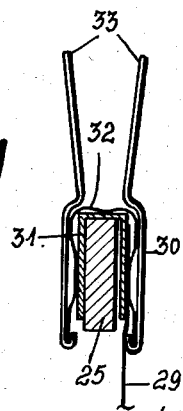
Fig. 11
Fig. 12.
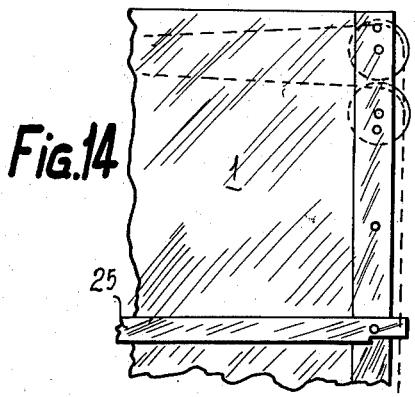
Fig. 14
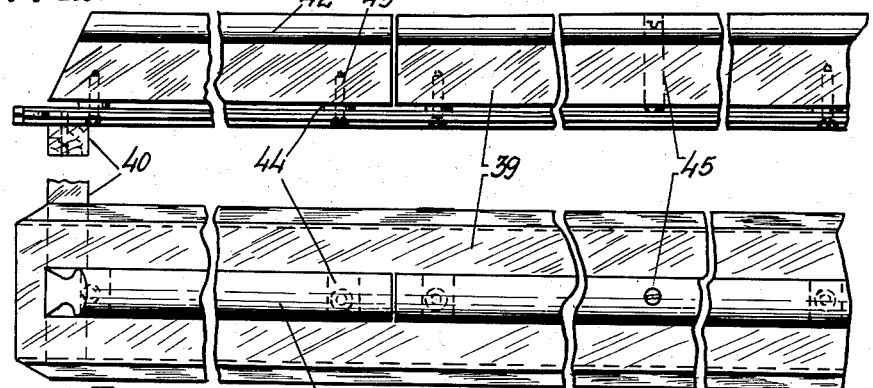
Fig. 13.

2,971,287

DRAWING DESK

Helmut Kurt Fritz Martin, Porto Alegre, Brazil
(Wagnerstr. 11, Geislingen (Steige), Germany)

Filed Jan. 29, 1958, Ser. No. 711,890

8 Claims. (Cl. 45—131)

My present invention refers to certain new and useful improvements in or relating to drawing desks comprising a supporting structure and a drawing board carried by said structure.

The known drawing desks as at present in use have the same defect residing in that the drawer or designer only may take profit of the swivel stool generally provided for said desks when he works on the lower third portion of the drawing board, and that consequently he is compelled to perform the major part of his work in standing position. The disadvantages resulting from said defect consist not only in a reduction of the working capacity of the drawers or designers, but also in that in most of the cases their health and constitution are seriously affected when such work is practised for quite a number of years.

The main object of my invention consists in entirely eliminating the said defect and the drawbacks resulting therefrom and in providing an equipment for the technical drawer or designer enabling him to do his work in sitting position without suffering fatigue and injuries, with the advantageous result that the drawer's or designer's working capacity is improved and maintained for a considerably longer time than that he may expect to be able to work on the known drawing desks.

In accordance herewith the main object of the present invention is to provide an improved drawing desk comprising a supporting structure, at least one drawing board mounted on said supporting structure, a suspension device on said drawing board for the displacement of the drawing paper on this board and guide means arranged behind the drawing board for the deviation of the lower end portion of the drawing paper to a position beyond the reach of the designer's knees. By virtue of the provision of said suspension device and guide means the sheet of drawing paper may be readily displaced on the drawing board and adjusted in height in such a manner that the designer may always work on the lower third portion of the drawing board i.e. in a sitting position. For the deviation of the drawing paper a deviation slot is preferably provided along the lower edge of the drawing board with the advantageous result that the turning edge of the drawing paper can not be soiled or damaged.

Another object of my invention is to provide an improved drawing desk as hereinbefore set forth wherein the said suspension device for the drawing paper comprises a removable suspension rod and parallel guide means in connection with the latter and in such an arrangement that the said suspension rod together with the sheet of drawing paper may readily be displaced up and down on the drawing board and removed therefrom. The guide means forming part of the suspension device comprise a pair of guide members parallel to the sides of the drawing board and provided with supporting means for removably carrying the said suspension rod, a connecting rod for said guide members and an endless guide wire connected with these guide members and preferably provided with a counter-weight, with the advantageous result that this suspension device ensures the possibility of an easy and correct displacement of the drawing paper. The said guide members are provided with guide plates projecting therefrom and engaging corresponding guide grooves cut into backwardly projecting side pieces of the drawing board, said guide plates being relatively long so as to ensure the advantage of the suspension rod and the drawing paper being maintained in good working position i.e. in flat contact with the surface of the drawing board.

Still another object of the invention is to provide an improved drawing desk comprising a movable suspension device for the drawing paper as set forth, wherein the said suspension rod on the rear surface of its end portions is provided with recesses and with paper-clamping devices movably and removably arranged on said rod in its recessed portions, each of these clamping devices being composed of a U-shaped member of sheet metal and of a clip member placed on said U-shaped member, and the legs of said clip being so constructed that their free edges may be readily engaged and that their legs may be opened by means of two opposite cooperating levers for the purpose of inserting and fastening the upper edge portion of the drawing paper between said U-shaped member and said clip member. The said recesses, on the one hand, permit the suspension rod to lie flat on the drawing board in spite of said clamping devices and, on the other hand, allow a free displacement of said clamping devices with the advantageous result that under the influence of changes of the atmospheric humidity the drawing paper may freely expand or contract and that crimping of the paper is efficiently avoided.

A further object of my invention is to provide an improved drawing desk as set forth, wherein the drawing paper as suspended by the described suspension device is deviated behind the drawing board and wherein for this purpose a deviation slot is formed between the lower edge of the proper drawing board and a border member and behind the latter slide and guide surfaces are provided for causing the lower end portion of the drawing paper, when moved downwards on the drawing board, to take a position beyond the reach of the knees of the sitting designer.

The so movably suspended drawing paper, as already explained, permits the designer to perform his work practically on the lower third portion of the drawing board i.e. to remain sitting. As a consequence hereof the paper cover usually provided on the drawing board is subject to wear on the lower portion of the letter only. Therefore, in order to also take profit of the remaining part of the cover sheet, an additional object of the invention is to provide an improved drawing desk wherein said cover sheet of the drawing board is also arranged for displacement and deviation through the afore-mentioned deviation slot. For this purpose at the top of the drawing board and behind the lower portion of the latter there are provided supporting means for unwinding and re-winding the cover paper, respectively. Advantageously a protecting and braking cover of flexible sheet material is provided for the roll of cover paper on said upper supporting means for preventing this cover paper from becoming spontaneously unwound.

According to an advantageous feature of the invention, the border member forming the deviation slot referred to is slidably or rotatively mounted in such a manner that said slot may be enlarged for facilitating the introduction of the drawing paper and cover paper.

In accordance with another feature of the invention, the arrangement of the described suspension device and its parallel guide is such that below the suspension rod a drawing rule may be displaceably suspended in a similar manner by means of a second parallel guide.

Therefore, a further object of the invention is to provide an improved drawing desk comprising in combination with the described suspension device for the drawing paper a drawing-rule provided at both ends with a guide arm similar to the guide members of said suspension device, said guide arms having guide plates engaging guide grooves of the side pieces of the drawing board and being connected with an endless guide wire and the arrangement of said guide arms being such that they pass at the outside of the guide members of said suspension device and that by virtue hereof the suspension rod and the drawing-rule may be moved to positions at the top edge of the drawing board, respectively at the lower edge of the aforementioned border member, and that nevertheless the guide rolls of the wire guide may by arranged at certain distance from said top edge and lower edge, respectively, with the advantageous result that particularly the lower guide rollers do not disturb the designer and that the upper guide rollers may be arranged at least partly hidden behind the drawing board.

In order to readily effect the displacement of the drawing paper below the drawing-rule, the parallel-guide means of the latter in accordance with the invention are so constructed and arranged that said drawing-rule may be slightly lifted from the drawing board. This is rendered possible by the indirect connection of the drawing-rule with the guide wire, namely by means of the afore-mentioned guide arms and their guide plates which by means of relatively narrow end portions engage the guide grooves of the side pieces of the drawing board. This indirect connection requires a special construction of the guide rule.

Therefore, an additional object of my present invention is to provide an improved drawing desk as set forth, wherein the handle bar of the drawing-rule extending substantially over the whole length of the rule is transversely subdivided and is secured to the proper rule by means of screws with the interposition of distance disks providing for a separation between the upper rule surface and the parts of the handle bar, and wherein the middle part or parts of the handle bar are provided with set screws so arranged that the centre portion of the rule may be slightly bent in a convex curvature (with regard to the drawing board) and that on the other hand a concave bending of the rule when lifted from the drawing board is avoided whereby an otherwise possible locking of the guide plates in the guide grooves is rendered impossible.

In accordance with a particular embodiment of my invention, the improved drawing desk is provided with two oppositely inclined drawing boards, one of which considered to be the main drawing board is fixedly mounted, whereas the auxiliary one may be drawn outwards under maintenance of its inclined position. If in a technical office several drawing desks are placed one behind another, said auxiliary board may be advantageously used for the suspension of a model or pattern plan or the like and the designer has the possibility of conveniently adjusting said auxiliary board.

The construction of the auxiliary board in as far as the suspension and parallel guide of the drawing paper and drawing-rule are concerned, is like that of the main board.

The two boards are carried by a supporting structure comprising a pair of lateral supports to which said boards are conveniently secured by screws and which in their upper parts are interconnected by means of two horizontal reinforcement members and in their lower parts by means of one inclined reinforcement member and by two horizontal bars serving as footrests for the designer. At both of said horizontal reinforcement members the free space between the two drawing boards is advantageously used for the provision of horizontal boards capable of acting as additional reinforcement members and at the same time as shelves. The lower part of the supporting structure is so designed that the drawer or designer may freely move his legs as desired. The said horizontal reinforcement members offer the possibility of providing the drawing equipment with a table and sideboard for the designer's comfort.

In view of that the drawing board or boards may be relatively broad and of that the breadth of the equipment is preferably enlarged by the provision of the aforementioned table and sideboard, the present invention proposes the use of a swivel stool and of a rail for the easy displacement of said stool which comprises a cross foot with two rollers on said rail and with two further rollers to rest on the floor. The stool-guiding rail is arranged in parallel direction to the drawing board and is fixed on the floor or secured in any suitable known manner to the pedestals or supports of the supporting structure of the drawing desk and is of such a length that the designer sitting on said stool may freely and easily move over the whole breadth of the drawing equipment.

With these objects and advantageous features in view my present invention comprises the arrangement, combination and construction of parts as will be hereinafter fully described with particular reference to the accompanying drawings whereon a preferred embodiment of the invention has been illustrated by way of example only and whereon:

Figure 1 is a schematic side view of my improved desk provided with two oppositely inclined drawing boards and with a rolling swivel stool;

Figure 2 is a schematic plan view showing the combination of two drawing desks according to my invention;

Figure 3 is a schematic front view of the drawing desk;

Figure 4 is an enlarged fragmentary side view of the improved drawing desk provided with two drawing boards;

Figure 5 is an enlarged vertical cross sectional view according to Figure 4, taken approximately along the line V—V of Figure 2;

Figure 6 is an enlarged vertical cross sectional view of the top portion of the drawing desk, taken approximately along the line V—V of Figure 2;

Figures 7 and 8 are enlarged detail front and side views showing the arrangement of the parallel guides of the suspension devices for the drawing paper and the drawing-rule, respectively;

Figures 9, 10 and 11 show in front view, plan view and cross sectional view, respectively, a clamping device for securing the drawing paper to the suspension rod and part of this rod;

Figures 12 and 13 show part of the drawing-rule in a longitudinal sectional view and plan view, respectively.

Figure 14 shows a modified arrangement of the suspension device for the drawing paper.

The drawing desk as schematically shown in Figure 1 comprises two oppositely inclined drawing boards 1 and 2, forming between them an angle of about 40° and of which the main drawing board 1 is fixedly mounted, whereas the auxiliary board 2 may be drawn outwards as illustrated.

The supporting structure carrying the two boards 1 and 2 consists of two supports, of which but one is seen in Figure 1 and each of which has its lower part formed by two crossed inclined stays 3 and 4 and by a base bar 5 interconnecting the lower ends of said stays, whereas the upper parts of the two supports comprise each 2 pairs of oppositely inclined bars 6 for sustaining the two boards 1 and 2 and three horizontal bars 7, 8, 9, of which the bar 8 acts as guide bar for the slidable auxiliary board 2 and is slidably arranged between the bars 7 and 9. The two supports are interconnected at different levels by two bars 10, 11 and by a board 12 and are reinforced by two plywood boards 13, 14 which at the same time may be used for laying aside drawing utensils, books, and the like.

The stays 4 of the two supports are interconnected by reinforcement member of ply-wood 19 and finally the base bars 5 of said two supports are interconnected by bars 15, 16 acting at the same time as rests for the designer's feet.

The reference numeral 17 indicates a table (Figures 1 and 2) rotatively secured to the respective end of the bar 10, whereas 18 is a small sideboard at the opposite side of the drawing desk.

The supporting structure of the drawing desk as hereinbefore described and as illustrated on the accompanying drawings may of course be changed in its details.

By way of example, in Figure 2 I have shown a convenient arrangement of two drawing desks with a rolling swivel stool 20 provided between the desks. In order to give the designer the required liberty to move from one side of the desks to the other without getting up from his stool 20, the latter comprises a rolling cross foot 21 and loose rollers carried by the arms of said foot. The rollers 22 of the front and rear arms rest on the floor, whereas the rollers 23 of the side arms are destined for displacement on a rail 24 fixed on the floor and capable of guiding the stool in its movements in front of the desks. In view of that the stool 20 is constructed as a swivel stool, the sitting designer may readily occupy the different positions indicated in Figure 2.

In order to enable the designer to do his work on the drawing board 1 and/or 2 in sitting position i.e. to do his working on the lower third portion of said board near the lower or near edge thereof, according to my present invention I have provided an adjustable suspension device for the drawing paper on said board. This device comprises a suspension rod 25, a connection rod 26 and guide members 27 to which the endless guide wire 28 is connected.

For fastening the drawing paper 29 on the suspension rod I provide at least two clamping devices 30. Each of these devices comprises a U-shaped member of sheet metal 31 removably placed on the suspension rod 25, and a clip 32 placed on said U-shaped member and so constructed that the free edges of the clip legs may be engaged and the clip be opened by means of a pair of opposite co-operating levers 33 so that the edge portion of the drawing paper may be inserted and fastened between the clip and the U-shaped member. In order to avoid that the clamping devices 30 prevent the suspension rod 25 from lying flat on the drawing board, the end portions of said rod are provided at the rear surface of the latter with longitudinal recesses 34 within which said clamping devices may readily move along the rod without lifting the latter from the drawing board. In the centre part of the suspension rod 25 the drawing paper is secured to the rear surface of the same by means of a usual drawing pin. The described arrangement of the clamping devices 30 affords the advantage that under the influence of changes of the atmospheric humidity the suspended drawing paper may freely expand and contract without crimping.

Near its ends the suspension rod 25 is provided with bores for readily fastening said rod on pins 35 of the guide members 27.

The connecting rod 26 serves for rigidly interconnecting the guide members 27 which one the other hand are secured to the guide wire 28 and which are provided with guide plates 36 engaging corresponding grooves 37 cut into backwardly projecting side pieces 38 of the drawing board. The guide plates 36 are relatively long and ensure an efficient guiding of the rods 25 and 26 in such a manner that the same always lie flat on the drawing board and so are prevented from taking an inclined position, with regard to the drawing board.

Below this suspension device there is provided a drawing rule 39 having guide arms 40 fixedly secured to the ends thereof and connected to a second guide wire 41. The arrangement of the guide arms 40 is as shown in Figures 3 and 7 such that they may pass the guide members 27 of the suspension device of the drawing paper. The guide arms 40 similar to the guide members 27 are provided with guide plates 46 which with relatively narrow end portions engage guide grooves 47 of the side pieces 38 of the drawing board. This construction of the guide plates 46 offers the advantage that the drawing rule 39 may be lifted from the drawing board over a small distance for the purpose of, for instance, cleaning the rear surface of the drawing rule.

This feature, however, may cause that when lifting the drawing rule, the guide plates 46 become locked in the guide grooves 47, particularly if after certain time of use the drawing rule suffers a slight bending. According to the embodiment shown in Figures 12 and 13, the handle bar 42 of the drawing rule 39 is transversely subdivided. The individual parts of the handle bar 42 are secured to the proper rule by screws 43 with the interposition of distance disks 44 or the like so that bar and rule are separated from one another. The centre part or parts of the handle bar 42 are provided with set screws 45 which after bridging the separation between the handle bar and the proper rule permit to slightly bend the centre portion of the rule so as to produce a flat convex curvature with regard to the drawing board and to thereby avoid a concave curvature in said rule.

The two guide wires 28 and 41 are guided at both sides of the drawing board near the upper and lower edges of the latter by means of loose grooved rollers. The lower guide rollers 48, 49 are mounted on a common shaft fixed in a supporting plate 80 arranged at each side of the drawing board immediately below the backwardly projecting side pieces 38 and secured to the drawing board. The upper guide rollers consist, at each side of the drawing board, of a first pair of relatively displaced rollers 50, 51 for the guide wire 28 and of a second pair of relatively displaced rollers 52, 53 for the guide wire 41. These individual guide rollers are mounted on opposite sides of a common supporting plate 54 as clearly shown in Figure 8. The plate 54 is secured to the rear surface of the drawing board with the interposition of suitable distance pieces 55, 56. Between these distance pieces a passage 57 is formed for one horizontal section of the guide wire 28, the second horizontal section of this wire 28 extending behind the supporting plate 54, whereas the horizontal sections of the guide wire 41 extend above, respectively behind said plate 54 (Figure 7).

In one horizontal section of each guide wire 28, 41 a stretching device of any known construction (not shown) is conveniently provided, whereas the vertical sections of said guide wires are provided with counter-weights 58 for the suspension device of the drawing paper and 58' for the drawing rule, said counter-weights being conveniently of such known construction that they may be secured to and removed from the wires after the latter being placed on their respective guide rollers.

In order to avoid that the drawing paper 29 when being lowered by means of the described suspension device, gets in touch with the knees of the sitting designer, the invention provides for a deviation device, comprising a border member 59 (Figure 4), a deviation slot 60 being formed between the upper edge of said border member and the lower edge of the drawing board. Immediately behind said border member 59 a first guide surface is formed by a bar of triangular cross section 61. Immediately behind the lower edge of the drawing board there is a guide bar 62 to the ends of which are secured the supporting plates 80. On the inner surface of these supporting plates 80 there are fixed short bar members 63 for supporting a guide plate 64 which together with the guide bar 60 and the border member 59 form the deviation device and guide the drawing paper 29 backwards to a position beyond the reach of the designer's knees.

In order to ensure a uniform deviation of the drawing paper over the whole length of the free edge of the guide plate 64, above the latter and adjacent the inner surfaces of the supporting plates 80 strips of strong paper 65 are secured to the end portions of a rod 66 fixed in corresponding notches 66' of said supporting plates 80.

In view of that the sitting designer almost exclusively works on the lower portion of the drawing board, the sheet of paper generally used for covering and protecting the drawing board is subject to wear on said lower portion only. This disadvantage is eliminated by that, in accordance with the invention, the cover paper, too, is displaceably arranged. For this purpose the drawing board near its far edge or top edge is provided with a bracket shelf 67 for supporting a roll of cover paper 68. This paper is drawn through a slot formed between the shelf 67 and the drawing board and through the deviation slot 60 and is wound up on a square rod 69 which in its inoperative position is supported in correspondingly bent arms 70. The arms are fixed to the supporting plates 80. The bars 62 and 66 serve for guiding the cover paper on its way from the slot 60 to the spool member 69.

In order to avoid a spontaneous unwinding of the cover paper from the roll 68, a cover of flexible sheet material 71 along one edge is clamped between a rod 72 and the bracket shelf 67 and along its opposite edge is provided with a rod-like weight 73. This cover 71 not only protects the paper roll 68 against dust, but also has a braking effect thereon.

According to a modified embodiment of the suspension device for the drawing paper, the suspension rod 25 may be directly connected with the drawing board 1, 2, for which purpose said rod near its ends is provided with pins 75 engaging corresponding bores 76 of the side pieces of the drawing board. A series of such bores provided along said side pieces permits for a step by step displacement of said suspension rod 25 together with the drawing paper attached thereto. Instead of the pins 75, bores may also be provided in the suspension rod 25 and loose pins may be inserted into the bores of both this rod and the side pieces 38.

It will be understood that my improved drawing desk may be provided with one drawing board only and this one drawing board may also be pivotally mounted if desired. If two drawing boards are provided, in connection with the auxiliary board 2, the means for the displaceable arrangement of the cover paper may be considerably simplified by providing near the top edge of the drawing board an oblique slot 74 (Figure 6) for receiving and retaining the correspondingly folded upper edge portion of a sheet of cover paper, whereas the lower edge portion of said cover paper is simply inserted into the deviation slot 60. Such and like minor amendments and modifications may be made and it will be understood that the same are to be considered as falling within the scope of the invention as clearly outlined in the appended claims.

What I claim as new and desire to secure by Letters Patent is:

1. Arrangement for positioning a sheet of drafting paper upon a drafting board comprising, in combination, a board structure having a far transverse edge and a near transverse edge as well as a pair of side edges defining a front face to support said sheet of drafting paper; suspension means slidably located upon said front face of the board structure for holding the upper edge of said sheet of drafting paper; and movable guide means for slidably displacing and positioning said suspension means together with said sheet of paper parallel to itself upon said front face to a desired position between said near and far edges of the board structure so that a desired portion of the sheet is located near said near edge.

2. Arrangement for positioning a sheet of drafting paper upon a drafting board comprising, in combination, a board structure having a far transverse edge and a near transverse edge as well as a pair of side edges defining a front face to support said sheet of drafting paper; suspension means slidably located upon said front face of the board structure for holding the upper edge of said sheet of drafting paper with said sheet adapted to hang freely from said suspension means; and a movable guide mechanism for said suspension means and for movably connecting the latter with said board structure for slidably displacing said suspension means together with said sheet of paper parallel to itself upon said front face to any position between said near and far edges of the board structure so that a desired portion of the sheet is located near said near edge.

3. Arrangement for positioning a sheet of drafting paper upon a drafting board comprising, in combination, a board structure having a far transverse edge and a near transverse edge as well as a pair of side edges defining a front face to support said sheet of drafting paper; suspension means slidably located upon said front face of the board structure for engaging and holding the upper edge of said sheet of paper with the sheet hanging freely from said suspension means; means for displacing and positioning said suspension means together with said sheet of paper parallel to itself upon said front face to any desired position between said near and far edges of the board structure so that the desired portion of the sheet is located near said near edge; and a transverse border member mounted on said board structure so as to constitute with said near edge portion a slot for the passage therethrough of said sheet of drafting paper.

4. The arrangement according to claim 3, with the addition of guide means connected to said border member for maintaining said sheet rearwardly deflected from said board structure.

5. The arrangement according to claim 3, wherein means are provided for adjustably mounting said border member on said board structure so that the width of said slot is readily adjustable.

6. The arrangement according to claim 3, wherein said border member comprises a plank member with a front face substantially in a plane with the front face of said board structure and arranged with its inner edge facing said near edge of the board structure and spaced to constitute therewith said slot, a bar member of substantially triangular cross section connected to the rear face of said plank member, with the addition of guide plate means connected to said plank and extending rearwardly and substantially at right angles from said board structure for maintaining said sheet rearwardly deflected from said board structure.

7. Arrangement for positioning a sheet of drafting paper upon a drafting board comprising, in combination, a board structure having a far transverse edge and a near transverse edge as well as a pair of side edges defining a front face to support said sheet of drafting paper, said side edges being provided with guide grooves opening on the lateral surface of side members of said board structure; suspension means slidably located upon said front face of the board structure for holding the upper edge of said sheet of drafting paper with said sheet adapted to hang freely from said suspension means; and a movable guide mechanism for said suspension means and for movably connecting the latter with said board structure in said guide grooves for slidably displacing said suspension means together with said sheet of paper parallel to itself upon said front face to any position between said near and far edges of the board structure so that a desired portion of the sheet is located near said near edge, said guide mechanism comprising a pair of guide members fixedly interconnected by a connecting rod member situated on said front face parallel to said suspension means and provided with guide plates engaging said guide grooves and connected to a usual counterweight loaded endless guide wire, the said suspension means being secured to said pair of guide members.

8. The arrangement according to claim 7, wherein the rear face of said bar member is formed with a longitudinal recess whereby a corresponding portion of the length of said bar member is spaced from said front face of the board structure for accommodating said clamping devices at least partially in said recess.

References Cited in the file of this patent

UNITED STATES PATENTS

| | | |
|---|---|---|
| 222,047 | Holden | Nov. 25, 1879 |
| 1,077,998 | Purkey | Nov. 11, 1913 |
| 1,942,727 | O'Farrell | Jan. 9, 1934 |
| 2,129,457 | Zimmermann | Sept. 6, 1938 |
| 2,283,997 | Jensen | May 26, 1942 |
| 2,515,474 | Ryder | July 18, 1950 |
| 2,627,696 | Wood | Feb. 10, 1953 |
| 2,699,627 | Mathews | Jan. 18, 1955 |
| 2,703,468 | Sheinwald | Mar. 8, 1955 |

FOREIGN PATENTS

| | | |
|---|---|---|
| 18,210/34 | Australia | May 16, 1935 |